(12) United States Patent
Blachek et al.

(10) Patent No.: US 6,169,930 B1
(45) Date of Patent: Jan. 2, 2001

(54) METHOD AND APPARATUS FOR PREVENTING COLD TEMPERATURE INDUCED DAMAGE IN A DISK DRIVE

(75) Inventors: Michael D. Blachek; Gordon James Smith, both of Rochester, MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/062,072

(22) Filed: Apr. 17, 1998

(51) Int. Cl.[7] .................................................. G05B 9/02
(52) U.S. Cl. ............................ 700/79; 360/97.02; 360/75
(58) Field of Search ........................... 700/79, 299, 300; 360/97.02, 78.04, 75

(56) References Cited

U.S. PATENT DOCUMENTS

| | | | |
|---|---|---|---|
| 4,907,183 | * 3/1990 | Tanaka | 364/707 |
| 5,434,737 | * 7/1995 | Miura | 360/97.02 |
| 5,469,419 | * 11/1995 | Iida et al. | 360/97.02 |
| 5,566,077 | * 10/1996 | Kulakowski et al. | 360/97.02 |
| 5,732,215 | * 3/1998 | Boutaghou et al. | 395/200.13 |
| 5,809,315 | * 9/1998 | Ohtsuka | 395/750.05 |
| 5,930,738 | * 7/1999 | Jones | 360/97.02 |

* cited by examiner

Primary Examiner—Glenn A. Auve
Assistant Examiner—Xuong Chung-Trans
(74) Attorney, Agent, or Firm—Joan Pennington

(57) ABSTRACT

A method and apparatus are provided for preventing cold temperature induced damage in a direct access storage device (DASD). A temperature of the direct access storage device (DASD) is measured and compared with a predetermined minimum cold temperature. The direct access storage device (DASD) is started responsive to the measured temperature being greater than or equal to the predetermined minimum cold temperature. A warning indication is provided to the user responsive to the measured temperature being less than the predetermined minimum cold temperature. A microcode routine is stored in a random access memory (RAM) in the DASD. The microcode routine is performed for heating the direct access storage device (DASD) responsive to the measured temperature being less than the predetermined minimum cold temperature.

15 Claims, 5 Drawing Sheets

METHOD AND APPARATUS FOR PREVENTING COLD TEMPERATURE INDUCED DAMAGE IN A DISK DRIVE

FIELD OF THE INVENITON

The present invention relates to a direct access storage device (DASD), and more particularly to a method and apparatus for preventing cold temperature induced damage in a direct access storage device (DASD).

DESCRIPTION OF THE RELATED ART

Direct access storage devices (DASDs) or hard drives are widely used with modern computers. Disk drive units often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks.

In today's mobile computing age, there are environmental conditions where applying power and attempting to spin up a magnetic disk drive storage device can lead to irreversible damage and data loss. Mobile computer manufacturers have been warning customers of the hazards of powering up a cold laptop computer. Users are warned to avoid turning on "cold" or "frozen" systems until the unit has warmed to a safe temperature. The terms "warmed to room temperature" and "the hard drive will freeze" are intended to provide guidelines; however, such warning statements that have been issued on the Internet or in product manuals may go unread, or may be misinterpreted or unheeded by users.

A need exists for a method and apparatus to protect end users from cold temperature induced damage in a direct access storage device (DASD) and resultant data loss.

SUMMARY OF THE INVENTION

A principal object of the present invention is to provide an improved method and apparatus for preventing cold temperature induced damage in a direct access storage device (DASD). Other important objects of the present invention are to provide such method and apparatus substantially without negative effects; and to provide such method and apparatus that overcome many of the disadvantages of prior art arrangements.

In brief, a method and apparatus are provided for preventing cold temperature induced damage in a direct access storage device (DASD). A temperature of the direct access storage device (DASD) is measured and compared with a predetermined minimum cold temperature. The direct access storage device (DASD) is started responsive to the measured temperature being greater than or equal to the predetermined minimum cold temperature.

In accordance with features of the invention, a warning indication is provided to the user responsive to the measured temperature being less than the predetermined minimum cold temperature. A microcode routine is stored in a random access; memory (RAM) in the DASD. The microcode routine is performed for heating the direct access storage device (DASD) responsive to the measured temperature being less than the predetermined minimum cold temperature.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
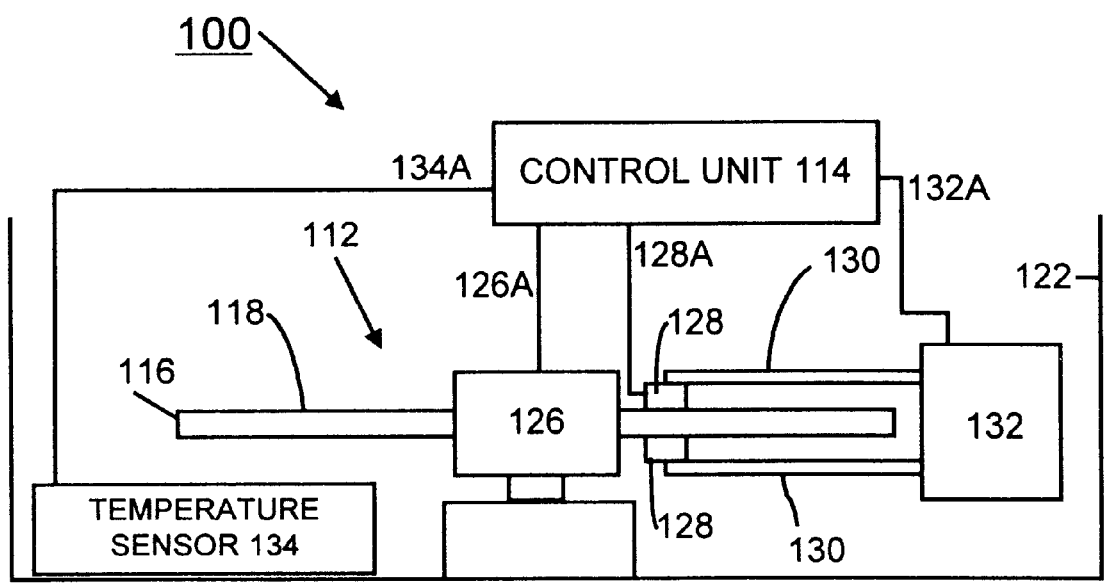
FIG. 1 is a schematic and block diagram of a data storage disk file embodying the present invention.

Having reference now to the drawings, in FIG. 1 there is illustrated a data storage disk file generally designated as 100 including a rigid magnetic disk drive unit 112 and an interface control unit generally designated as 114. Unit 112 is illustrated in simplified and diagrammatic form sufficient for an understanding of the present invention. The utility of the present invention is not restricted to the details of a particular drive unit construction.

The disk drive unit 112 includes at least one disk 116 having at least one magnetic surface 118 contained with a disk drive enclosure 122. The disk 116 is mounted for rotation on and by an integrated spindle and motor assembly 126. Information on each magnetic disk surface 118 is read from or written to the disk surface 118 by a corresponding transducer head assembly 128 movable in a path having a radial component across the rotating disk surface 118. Each transducer head assembly 128 is carried by a suspension arm assembly 130. The suspension arm assemblies 130 are ganged together for simultaneous pivotal movement by a actuator coil motor 132 cooperating with an internal magnet and core assembly. Drive signals applied to the actuator coil motor 132 cause the arms 130 to move in unison to position the transducer head assemblies 128 in registration with information storage tracks on the disk surfaces 118 where information is written or read.

The disk drive unit 112 is controlled in operation by signals provided by the control unit 114, including motor control signals on line 126A and head position control signals on line 132A. In a typical arrangement, control unit 114 provides an interface with a computer that provides data read and write commands, and data signals are transmitted to or from the transducer head assemblies 128 over corresponding lines 128A, one of which is seen in FIG. 1. Servo position information is recorded on the disk surfaces 118, and the transducer head assemblies 128 read this servo information to provide a servo position signal to the control unit 114. This information is employed by the control unit 114 to provide position control signals on line 132A.

In accordance with features of the invention, a low-cost, temperature sensor 134 is provided to detect when the temperature of a disk drive unit 112 is below a set value or safe level for normal operation of the disk drive unit 112. The method of the invention operatively controls when a notebook computer or other computer should be turned on after being in a cold environment. A temperature indicative signal at line 134A applied to the control unit 114 is used to prevent cold temperature induced damage in the disk drive unit 112. The temperature of the disk drive unit 112 is measured before the disk drive unit 112 is started. When the temperature of the disk drive unit 112 is below the set value, the disk drive unit 112 is not started.

The temperature sensor 134 is attached to or in the disk drive unit 112 so that the drive temperature rather than the temperature of the associated computer is measured. Besides the go/no-go temperature control for the disk drive unit 112, the method of the invention operates to elevate the internal temperature of the disk drive unit 112 in-situ so that an otherwise recommended 20–30 minute wait is not necessary.

Figure 2:
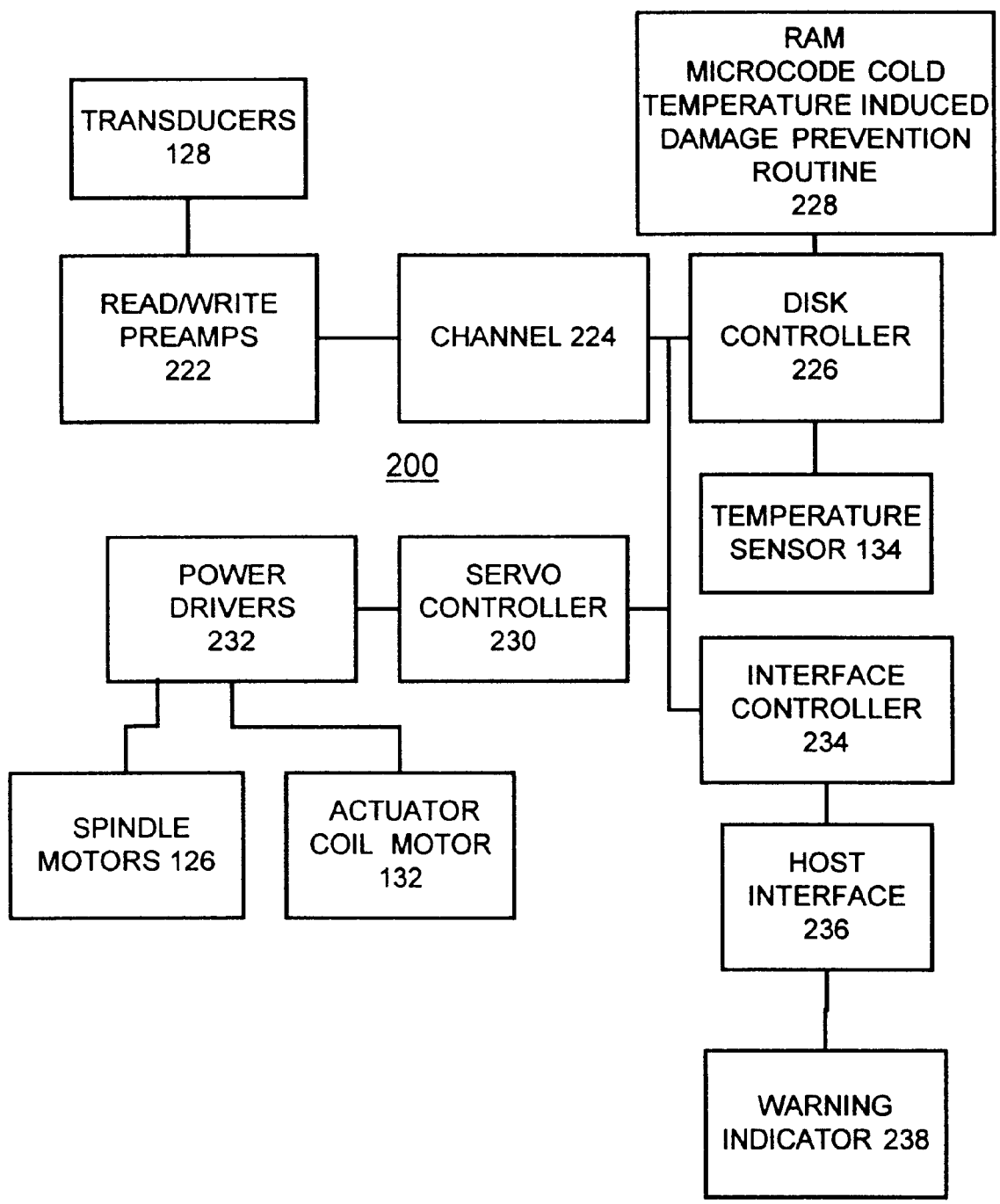
FIG. 2 is a block diagram illustrating the data storage disk file of FIG. 1 in accordance with the present invention.

Referring now to FIG. 2, there is shown a block diagram functional representation of the disk file 100 generally designated as 200 for carrying out the cold temperature induced damage prevention method of the invention. Servo information and customer data are read by the transducers 128 and amplified by read/write preamplifiers (preamps) 222. A data channel 224 detects the readback signals from the disk surfaces 118 that contain the customer data. An embedded disk controller 226 is coupled to the temperature sensor 134 and is coupled to a random access memory (RAM) 228. The RAM 228 stores microcode defining a cold temperature induced damage prevention routine in accordance with the preferred embodiment. It should be understood that a read only memory (ROM) could be used to store the microcode defining the cold temperature induced damage prevention routine. The embedded disk controller 226 is coupled to the data channel 224 and a servo controller 230. The servo controller 230 performs servo control functions providing servo positioning control signals to a power drivers block 232 coupled to the spindle motor 126 and the actuator coil motor 132. An interface controller 234 coupled to the disk controller 226 performs interface processor functions. A host interface 236 is coupled to the disk controller 226 via the interface controller 234. The host interface 236 is coupled to a warning indicator 238 to display a visual or audible warning to users when the disk drive unit 112 is too cold to be safely powered up for normal operation.

Warning indicator 238 can be electrical, chemical, or mechanical in nature. A simple, low cost, and easily manufacturable flat liquid crystal thermal device can be used for the warning indicator 238 for providing a go/no-go visual warning and can be attached to existing laptop computers. Both audible alarms and visual warnings can be provided by the warning indicator 238 included with the disk file 100 to provide user cold system warnings.

Figure 3:
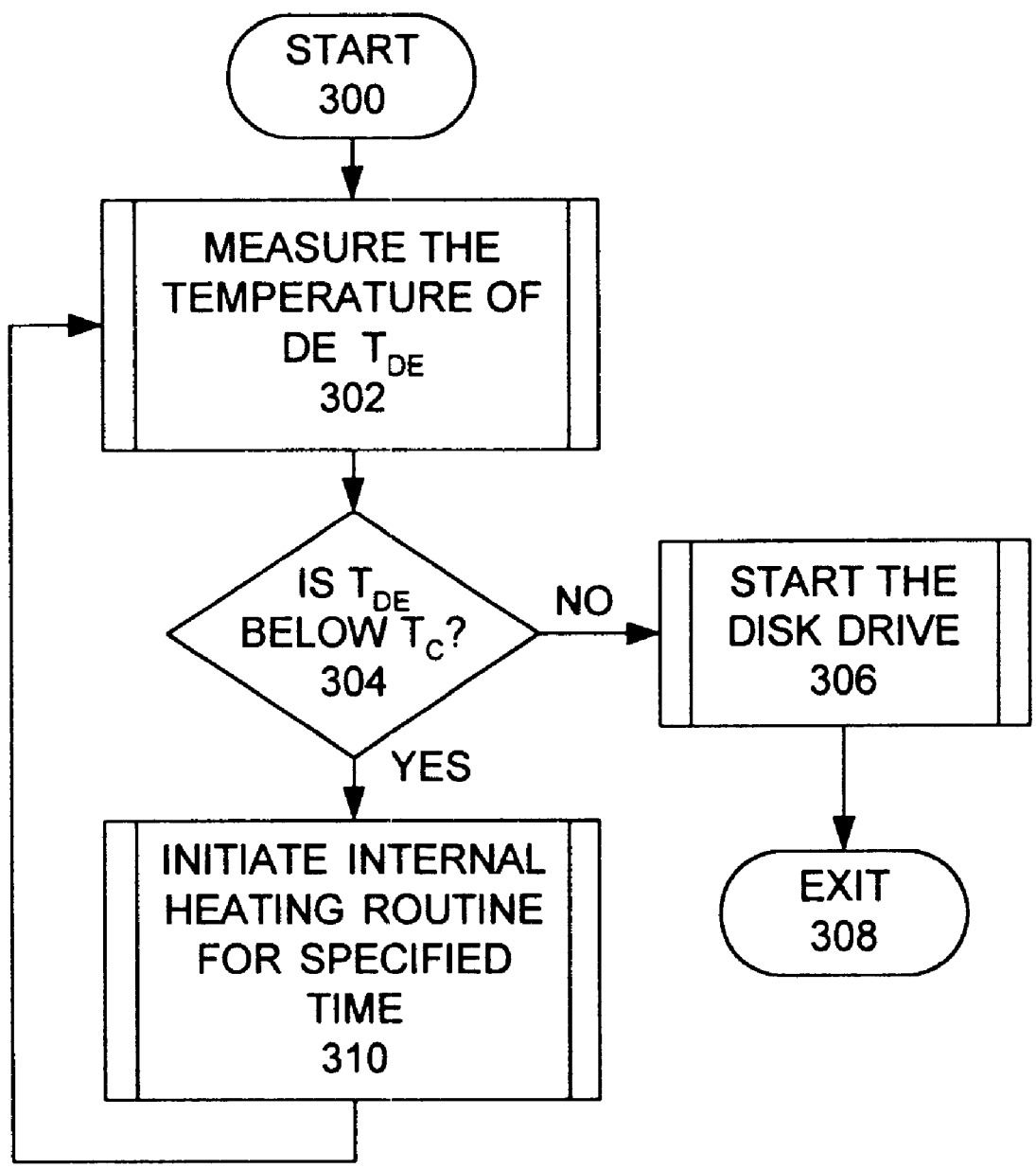
FIG. 3 is a flow diagram illustrating exemplary sequential steps performed by a disk file controller in the data storage disk file of FIG. 1 in accordance with the present invention.

FIG. 3 is a flow diagram illustrating exemplary sequential steps performed by a disk file controller 114 to prevent the disk drive unit 112 from powering up until the predetermined temperature is reached starting at block 300. The control program in accordance with the method of the present invention preferably is stored in the non-volatile RAM 228 for controlling start-up of the disk drive unit 112. It should be understood that the disk drive unit 112 can be prevented from powering up by utilizing various techniques, such as a mechanical or thermostat control of a power-on switch to prevent the entire system from powering up until a safe operating temperature is achieved. The temperature of the disk drive enclosure (DE) is measured as indicated at a block 302. Checking whether the measured disk drive temperature $T_{DE}$ is below the predetermined cold temperature $T_C$ is performed as indicated at a decision block 304. When the measured disk drive temperature $T_{DE}$ is not below the predetermined cold temperature $T_C$, then the disk drive unit 112 is started as indicated at a block 306. This completes the sequential operations as indicated at a block 308. Otherwise, when the measured disk drive temperature $T_{DE}$ is below the predetermined cold temperature $T_C$, then the disk drive unit 112 is not started and an internal heating routine is initiated for a specified time period as indicated at a block 310. Then the sequential operations continue returning to block 302 to measure the drive temperature $T_{DE}$.

Figure 4:
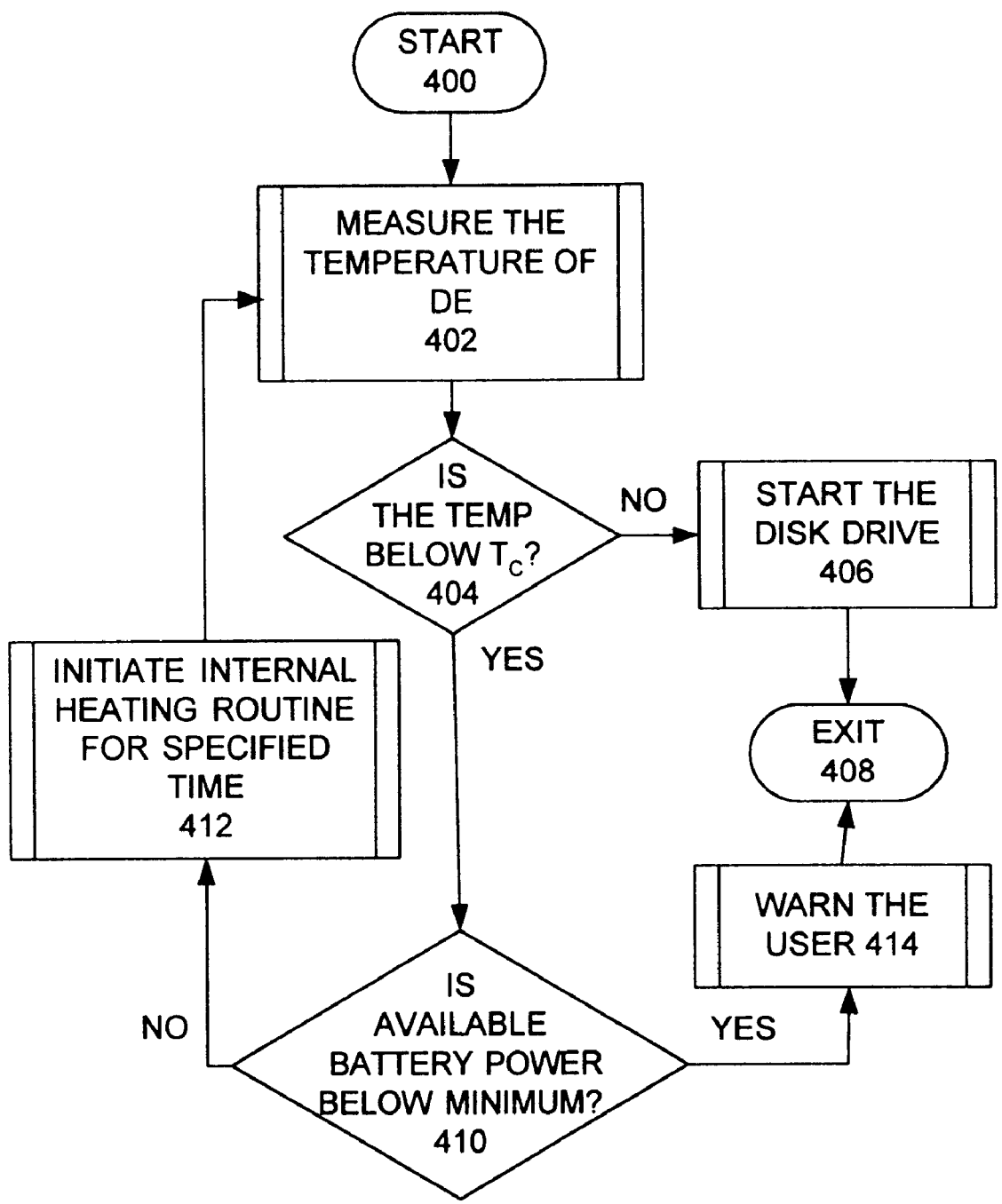
FIG. 4 is a flow diagram illustrating exemplary alternative sequential steps performed by a disk file controller in the data storage disk file of FIG. 1 in accordance with the present invention.

FIG. 4 is a flow diagram illustrating alternative exemplary sequential steps performed by a disk file controller 114 to prevent the disk drive unit 112 from powering up until the predetermined temperature is reached starting at block 400. In FIG. 4, the method is augmented, particular for battery powered, portable computer use. The temperature of the disk drive enclosure (DE) is measured as indicated at a block 402. Checking whether the measured disk drive temperature $T_{DE}$ is below the predetermined cold temperature $T_C$ is performed as indicated at a decision block 404. When the measured disk drive temperature $T_{DE}$ is not below the predetermined cold temperature $T_C$, then the disk drive unit 112 is started as indicated at a block 406. This completes the sequential operations as indicated at a block 408. Otherwise, when the measured disk drive temperature $T_{DE}$ is below the predetermined cold temperature $T_C$, then checking whether the available battery power is below a minimum threshold is performed as indicated at a decision block 410. The available battery power is provided to the disk file controller 114 by the host system via the host interface 236. When the available battery power is not below a minimum threshold, the disk drive unit 112 is not started and an internal heating routine is initiated for a specified time period as indicated at a block 412. Then the sequential operations continue returning to block 402 to measure the drive temperature $T_{DE}$. The active temperature acclimation process is halted when the available battery energy drops below a critical level. When the available battery power is below the minimum threshold, a warning is provided for the user as indicated at a block 414 to complete the sequential operations at block 408.

Figure 5:
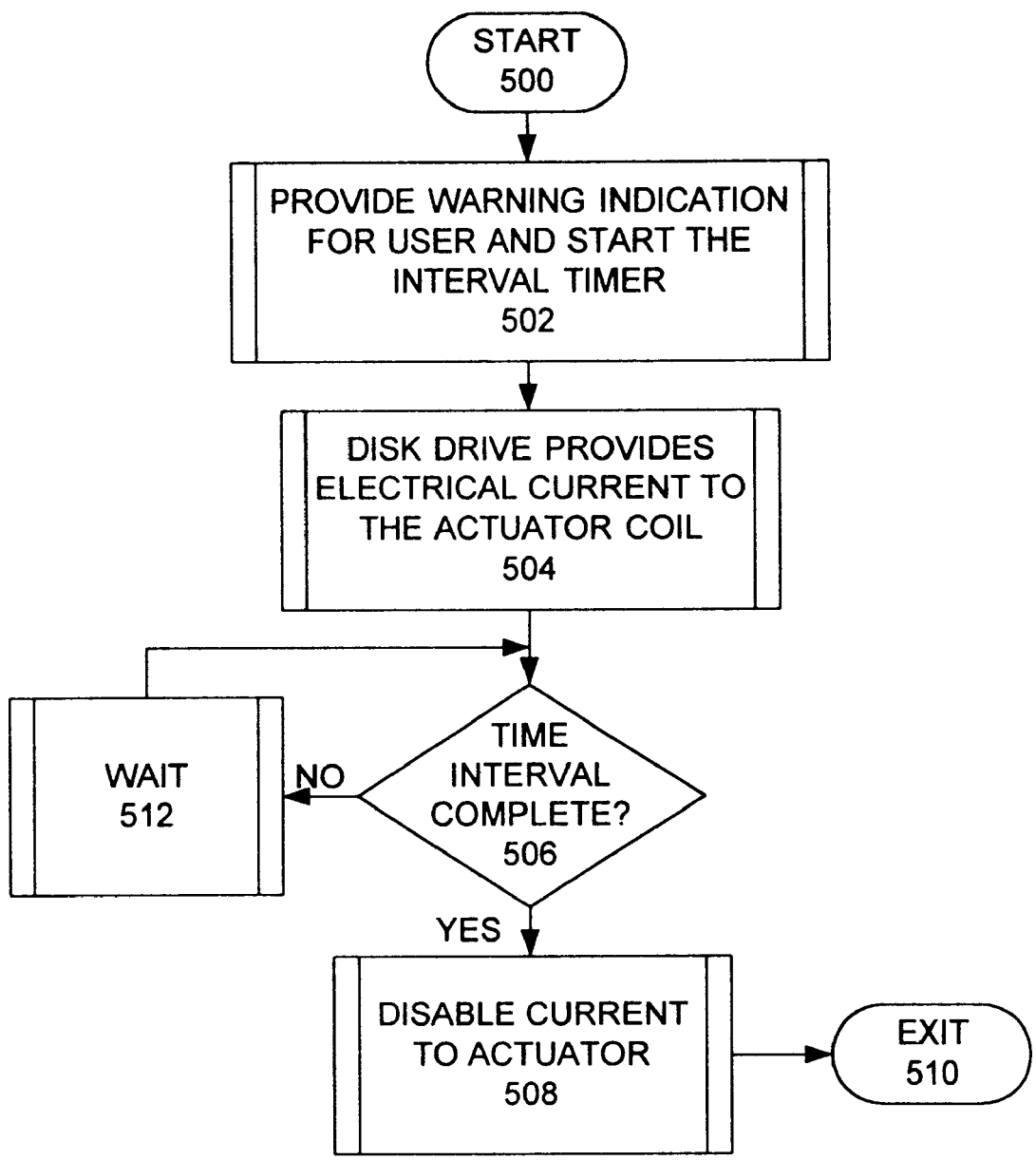
FIG. 5 is a flow diagram illustrating exemplary sequential steps performed by a disk file controller for heating a disk drive unit in the data storage disk file of FIG. 1 in accordance with the present invention.

FIG. 5 illustrates exemplary sequential steps performed by the disk file controller 114 for heating the disk drive unit 112 in accordance with the present invention. The disk drive unit 112 advantageously is designed to prevent and correct conditions that otherwise could lead to drive failure. As indicated at a block 502, a warning indication is provided for the user and the interval timer is started. The disk drive unit 112 provides electrical current to the actuator coil as indicated at a block 504. With the actuator in the parked state, an electrical current is applied. The direction of the current in the coil is applied at block 504 such that movement of the recording heads 128 is toward a parked position which is in the opposite direction from the normal recording areas of the disk surfaces 118. A disk drive unit 112 having a landing zone near the inner diameter of the disk 116 has a current applied at block 504 to force the actuator further toward the inner diameter of the disk 116. For a disk drive unit 112 having a load/unload mechanism, the actuator is forced away from the center of the disks. This applied current to the actuator provides disk enclosure heating.

It should be understood that disk enclosure heating can be accomplished with spindle power pulsing or oscillation while not actually spinning the motor until a safe temperature is reached. Also a logic printed control card (PCB) can be used to generate heat to bring the disk enclosure to a safe start up temperature.

Checking whether the time interval is complete is performed as indicated at a decision block 506. When the time interval is complete, current to the actuator is disabled as indicated at a block 508. This completes the sequential steps as indicated at a block 510. Otherwise when the time interval is not complete, waiting is provided as indicated at a block 512. Then the sequential steps continue with checking whether the time interval is complete is performed at decision block 506.

It should be understood that: with disk drives 112 including head load/unload technology, the motor 126 can be spun, but head load delayed, until the interface is up to a safe temperature. In disk drives 112 without load/unload technology, the disk drive temperature can be sensed, and self heating utilized to bring the head/disk interface to a safe temperature.

While the present invention has been described with reference to the details of the embodiments of the invention shown in the drawing, these details are not intended to limit the scope of the invention as claimed in the appended claims.

What is claimed is:

1. A method for preventing cold temperature induced damage in a direct access storage device (DASD) comprising the steps of:

measuring a temperature of the direct access storage device (DASD);

comparing a predetermined minimum cold temperature with said measured temperature; and starting the direct access storage device (DASD) responsive to said measured temperature being greater than or equal to said predetermined minimum cold temperature;

heating said direct access storage device (DASD) responsive to said measured temperature being less than said predetermined minimum cold temperature by applying a current to an actuator in said direct access storage device (DASD) and said applied current having an opposite direction as a normal current for moving a transducer head onto a disk surface; and identifying a predefined time interval, and disabling said applied current responsive to said identified predefined time interval.

2. A method for preventing cold temperature induced damage in a direct access storage device (DASD) as recited in claim 1, wherein said temperature measuring step including placing a sensor inside said direct access storage device (DASE)).

3. A method for preventing cold temperature induced damage in a direct access storage device (DASD) as recited in claim 1, wherein said temperature measuring step including attaching a sensor to an enclosure of said direct access storage device (DASD).

4. A method for preventing cold temperature induced damage in a direct access storage device (DASD) as recited in claim 1, further includes the step of providing a warning indication for a user.

5. A method for preventing cold temperature induced damage in a direct access storage device (DASD) as recited in claim 1, further includes the step of comparing an available battery power with a minimum value.

6. A method for preventing cold temperature induced damage in a direct access storage device (DASD) as recited in claim 5, wherein the step of heating said direct access storage device (DASD) is responsive to said available battery power being greater than or equal to said minimum value.

7. A method for preventing cold temperature induced damage in a direct access storage device (DASD) as recited in claim 5, further includes the step of providing a warning to a user responsive to said available battery power being less than said minimum value.

8. A direct access storage device (DASD) comprising:

at least one disk mounted for rotation;

a transducer head mounted for movement across a disk surface, a sensor for measuring a temperature of the direct access storage device (DASD);

a controller coupled to said sensor for comparing a predetermined minimum cold temperature with said measured temperature; said controller operatively arranged for starting the direct access storage device (DASD) responsive to said measured temperature being greater than or equal to said predetermined minimum cold temperature; said controller operatively arranged for heating said direct access storage device (DASD) responsive to said measured temperature being less than said predetermined minimum cold temperature by applying a current to an actuator in said direct access storage device (DASD) and said applied current having an opposite direction as a normal current for moving a transducer head onto a disk surface; and for identifying a predefined time interval, and for disabling said applied current responsive to said identified predefined time interval.

9. A direct access storage device (DASD) as recited in claim 8, includes a warning indicator for providing a cold temperature warning to a user responsive to said measured temperature being less than said predetermined minimum cold temperature.

10. A direct access storage device (DASD) as recited in claim 8, wherein said controller operatively arranged for comparing an available battery power with a minimum value and wherein said heating of said direct access storage device (DASD) is responsive to said available battery power being greater than or equal to said minimum value.

11. A direct access storage device (DASD) as recited in claim 8, wherein said controller operatively arranged for comparing an available battery power with a minimum value and for providing a warning to a user responsive to said available battery power being less than said minimum value.

12. Apparatus for preventing cold temperature induced damage in a direct access storage device (DASD) comprising:

means for measuring a temperature of the direct access storage device (DASD);

means for comparing a predetermined minimum cold temperature with said measured temperature;

means for starting the direct access storage device (DASD) responsive to said measured temperature being greater than or equal to said predetermined minimum cold temperature; and means for heating said direct access storage device (DASD) responsive to said measured temperature being less than said predetermined minimum cold temperature by applying a current to an actuator in said direct access storage device (DASD) and said applied current having an opposite direction as a normal current for moving a transducer head onto a disk surface; and for identifying a predefined time interval, and for disabling said applied current responsive to said identified predefined time interval.

13. Apparatus for preventing cold temperature induced damage in a direct access storage device (DASD) as recited in claim 12 wherein said temperature measuring means including a sensor provided with said direct access storage device (DASD).

14. Apparatus for preventing cold temperature induced damage in a direct access storage device (DASD) as recited in claim 12 further includes means for providing a cold temperature warning to a user responsive to said measured temperature being less than said predetermined minimum cold temperature.

15. Apparatus for preventing cold temperature induced damage in a direct access storage device (DASD) as recited in claim 12 further includes means for comparing an available battery power with a minimum value and said means for heating said direct access storage device (DASD) is responsive to said available battery power being greater than or equal to said minimum value.

* * * * *